United States Patent [19]

Yonezawa et al.

[11] 4,333,173
[45] Jun. 1, 1982

[54] OPTICAL INFORMATION PROCESSOR WITH PRISMATIC CORRECTION OF LASER BEAM SHAPE

[75] Inventors: Seiji Yonezawa, Hachiouji; Toshio Sugiyama, Toyokawa; Masahiro Ojima, Kokubunji, all of Japan

[73] Assignee: Hitachi, Ltd., Tokyo, Japan

[21] Appl. No.: 152,297

[22] Filed: May 22, 1980

[30] Foreign Application Priority Data

| Jun. 15, 1979 [JP] | Japan | 54-74664 |
| Oct. 29, 1979 [JP] | Japan | 54-148846[U] |
| Feb. 18, 1980 [JP] | Japan | 55-17813 |
| Apr. 10, 1980 [JP] | Japan | 55-48436[U] |

[51] Int. Cl.³ ............................................ G11B 7/12
[52] U.S. Cl. ................................. 369/45; 369/122; 250/201; 350/286
[58] Field of Search ............ 358/127, 128.5, 297, 358/298; 179/100.3 Z, 100.3 V; 346/76 L, 108; 350/286, 276 R; 250/201; 369/44, 45, 121, 122, 111, 112

[56] References Cited

U.S. PATENT DOCUMENTS

| 3,814,945 | 6/1974 | Allnutt | 350/286 |
| 3,941,945 | 3/1976 | Borner | 179/100.3 Z |
| 3,952,191 | 4/1976 | Tinet | 179/100.3 V |
| 3,969,573 | 7/1976 | Bouwhuis | 179/100.3 V |
| 3,974,507 | 8/1976 | Chemelli | 358/297 |
| 4,017,153 | 4/1977 | Sardos | 350/286 |
| 4,030,122 | 6/1977 | Chemelli | 346/76 L |
| 4,214,817 | 7/1980 | McNaney | 350/286 |

FOREIGN PATENT DOCUMENTS

| 53-17706 | 2/1978 | Japan | 369/45 |
| 1584664 | 2/1981 | United Kingdom | 369/45 |

Primary Examiner—John H. Wolff
Assistant Examiner—Alan Faber
Attorney, Agent, or Firm—Craig & Antonelli

[57] ABSTRACT

An optical information processor comprising a semiconductor laser device which has a rectangular light emitting region, a disk, and an optical system which includes a prism for converting a non-circular beam emergent from the laser device into a circular beam, the circular beam being projected onto the disk by the optical system thereby to record or play back predetermined information.

29 Claims, 22 Drawing Figures

OPTICAL INFORMATION PROCESSOR WITH PRISMATIC CORRECTION OF LASER BEAM SHAPE

BACKGROUND OF THE INVENTION

1. Field of the Invention

This invention relates to optical information processors, and more particularly to an optical information processor which employs a semiconductor laser device as a light source.

2. Description of the Prior Art

In recent years, optical information processors which employ semiconductor laser devices instead of gas lasers as the light sources thereof have been vigorously developed. An optical disk is an example of such technique. The optial disk is such that, using the semiconductor laser device, information signals recorded on a disk are played back or information is recorded onto the disk at a high density. In order to record the information signals onto the disk or play them back therefrom with the semiconductor laser, a light beam emergent from the semiconductor laser device must be formed into a light spot of approximately 1 $\mu$m in diameter on the disk by the use of a coupling lens and an objective which constitute an optical system. In general, the semiconductor laser device has a light emitting region which is not square but rectangular, and hence, the beam divergence parallel to the junction of the laser device is unequal to that perpendicular thereto. To the end of forming an isotropic or circular spot on the disk by means of such a semiconductor laser device, it is necessary to make the numerical aperture of the coupling lens small and to use only the beam in the vicinity of the optic axis of the optical system so as to render uniform the intensity distribution of light emergent from the coupling lens.

With this measure, however, only part of the light beam emitted from the semiconductor laser device is projected onto the disk, resulting in the disadvantage that the efficiency of light utilization of the apparatus is poor. That is, the ratio of the intensity of the focused light on the disk to that of the light emitted from the diode laser is small. Especially in case of the recording, a metallic thin film in the disk must be molten to form holes, and a light intensity several times higher than in case of the playback is therefore required. In addition, the semiconductor laser device has its lifetime shortened when it produces a light quantity exceeding a certain fixed value. In the optical information processor employing the semiconductor laser device, accordingly, it is necessary by all means from the viewpoints of lifetime and reliability that the efficiency of utilization of the light of the laser device is enhanced to restrain the optical output of the laser device to the utmost.

The disadvantages above described will be explained in detail in conjunction with a prior-art apparatus. As stated before, since the semiconductor laser device generally has the rectangular light emitting region, the beam divergence is anisotropic. The angle of divergence of the semiconductor laser beam differs depending upon the structure of the semiconductor laser device. As illustrated in FIG. 1, let $\theta\|$ and $\theta\perp$ denote the respective angles at $e^{-2}$ parallel to the junction of the laser device and perpendicular thereto in the intensity distribution of the laser beam in the far-field pattern.

Then, in the CSP (channeled-substrate-planar) type semiconductor laser, $$\theta\| = 8°, \theta\perp = 24° \text{ and } \theta\perp/\theta\| = 3 \tag{1}$$

In the BH (buried-heterostructure) type semiconductor laser, $$\theta\| = 16°, \theta\perp = 32° \text{ and } \theta\perp/\theta\| = 2 \tag{2}$$

In the BH type laser, the ratio $\theta\perp/\theta\|$ of the beam divergence angles is 2, while in the CSP type laser, it is 3. The axis of abscissas in FIG. 1 represents the angle of divergence, and the axis of ordinates the intensity of light. FIG. 2 shows an example of a prior-art optical information processor for forming the isotropic or circular spot of the diameter of approximately 1 $\mu$m on the disk in case where the cross-section of the light beam of the semiconductor laser device is anisotropic or elliptic.

Referring to FIG. 2, a beam having an elliptical beam divergence as has emerged from one facet of a semiconductor laser device 1 is shaped into a light spot 5 on a disk 4 by a coupling lens 2 and an objective 3. A light detector 6 is means for detecting the optical output of the semiconductor laser device 1. Shown at A is an optical axis. In FIG. 2, the numerical aperture NA of the coupling lens 2 has the following relation where 74 denotes the half solid angle defined between the semiconductor laser 1 and the lens 2:

$$NA = \sin\theta \tag{3}$$

As regards the beam divergence of the semiconductor laser device 1, when the magnitudes at $e^{-2}$ parallel to the junction and perpendicular thereto are denoted by $\theta\|$ and $\theta\perp$ respectively as described above, the numerical aperture NA Of the coupling lens 2 must be selected as follows in order to form the circular spot 5 on the disk 4 by the use of such semiconductor laser device:

$$\theta \lesssim \theta\| < \theta\perp \tag{4}$$

That is, it is necessary that the numerical aperture of the coupling lens 2 is made small to intercept light rays outside the axis and to use the beam only in the vicinity of the optical axis A ($\theta=0$) so as to make uniform the intensity distribution of light emergent from the coupling lens 2. According to the beam divergence angles shown in FIG. 1 and Expressions (1), (3) and (4), the following is assumed in the CSP type laser:

$$NA = 0.1 \tag{5}$$
$$\theta = 5.7° \; (< \theta\| < \theta\perp)$$

Then, the beam having passed through the coupling lens 2 becomes substantially circular, so that the circular spot 5 is formed on the disk 4.

However, when the light rays outside the optical axis are shut off in this manner, only part of the light beam emitted from the semiconductor laser device is projected onto the disk, which results in the disadvantage that the efficiency of utilization of the light of the laser device is inferior.

Usually, the disk rotates while moving up and down to the extent of 1 mm. In order to prevent the diameter of the spot from changing in spite of the vertical motions of the rotating disk, auto-focusing needs to be performed by optically detecting a deviation signal of the focused spot from the disk surface.

In the construction shown in FIG. 2, when the light reflected from the disk 4 is fed back to the semiconductor laser device 1, the output of the semiconductor laser 1 varies in accordance with the amount of the reflected light from the disk surface, so that the information of the disk 4 can be reproduced with the output of the light detector 6. This technique is disclosed in U.S. Pat. No. 3,941,945.

On the other hand, Japanese Unexamined Patent Application Publication No. 53-17706 has proposed a technique wherein to the end of detecting the deviation of a light beam on a disk, a light source or a lens is wobbled in the direction of the optical axis thereof, and the laser output is synchronously detected. This technique, however, has the disadvantage that the detectable range of deviations for the auto-focusing control is narrow. FIG. 3 shows the output variation of the semiconductor laser device 1 at the time when, in the construction shown in FIG. 2, the numerical aperture NA of the coupling lens 2 was 0.1 and the disk 4 was minutely moved along the optical axis. As understood from FIG. 3, when the numerical aperture NA of the coupling lens 2 is as very small as 0.1, the detectable range of deviations for the auto-focusing control extends only 10 μm. This drawback is attributed to the fact that the focus position of the reflected and fed-back light beam near the facet of the laser device changes greatly due to the movements of the disk. That is, the defocusing of the fed-back light spot on the facet of the laser device as is ascribable to the deviation of the focused spot is conspicuous, with the result that the detectable range of deviations for the auto-focusing becomes as small as 10 μm. In this manner, the optical information processor in which the light reflected from the disk is fed back to the semiconductor laser device has the disadvantage of the small detectable range of deviations. This has led to the problem that the auto-focusing control is difficult and that information cannot be reproduced from a disk of great vertical movements.

On the other hand, the use of a cylindrical lens has been considered in order to cause a spot focused on a disk to approximate a circle. The cylindrical lens, however, is disadvantageous in that a high machining precision is difficult to be attained, resulting in a high cost, and that the arrangement of an optical system becomes complicated. It is also difficult to converge a light spot into a circular one of 1 μm, because the astigmatism is greatly influential on account of the use of the cylindrical lens.

SUMMARY OF THE INVENTION

This invention has for its object to eliminate the disadvantages described above and to provide an optical information processor which can form a circular spot on a disk at a high light utilization efficiency by means of a simple optical system.

A further object of this invention is to provide an optical information processor which employs as its light source a reflected-beam-feedback semiconductor laser having a wide detectable range of deviations for an auto-focusing servo control.

In order to accomplish such objects, according to this invention, a prism is comprised in an optical system which guides a beam from a semiconductor laser device to an information storage medium. More specifically, this invention consists in that most of a non-circular beam from a semiconductor laser device is caused to enter a coupling lens by making the numerical aperture of the coupling lens large by neglecting Expression (4) which specifies the condition of the coupling lens to render a light spot on a disk circular, while a prism is arranged at a stage succeeding to the coupling lens, whereby the non-circular beam having passed through the coupling lens is converted into a circular beam.

DESCRIPTION OF THE PREFERRED EMBODIMENTS

Figure 2:
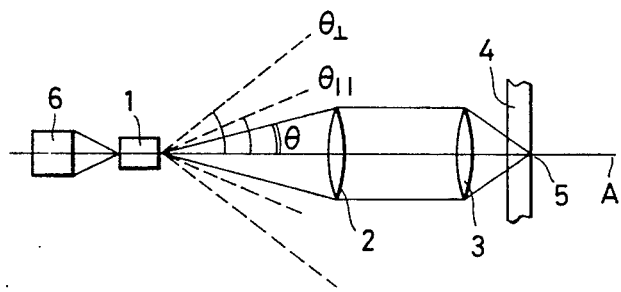
FIG. 2 is a diagram for explaining a prior-art optical information processor.
Figure 3:
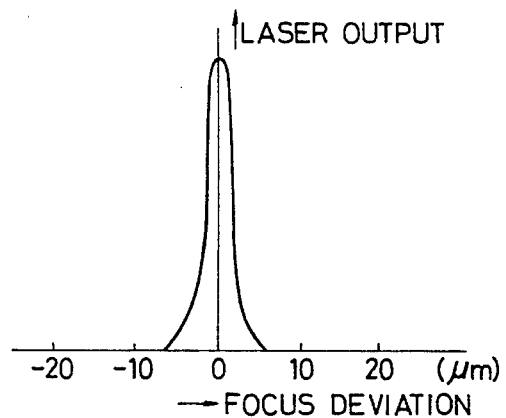
FIG. 3 is a diagram for explaining a detectable range of deviations for auto-focusing in the apparatus of FIG. 2.
Figure 4:
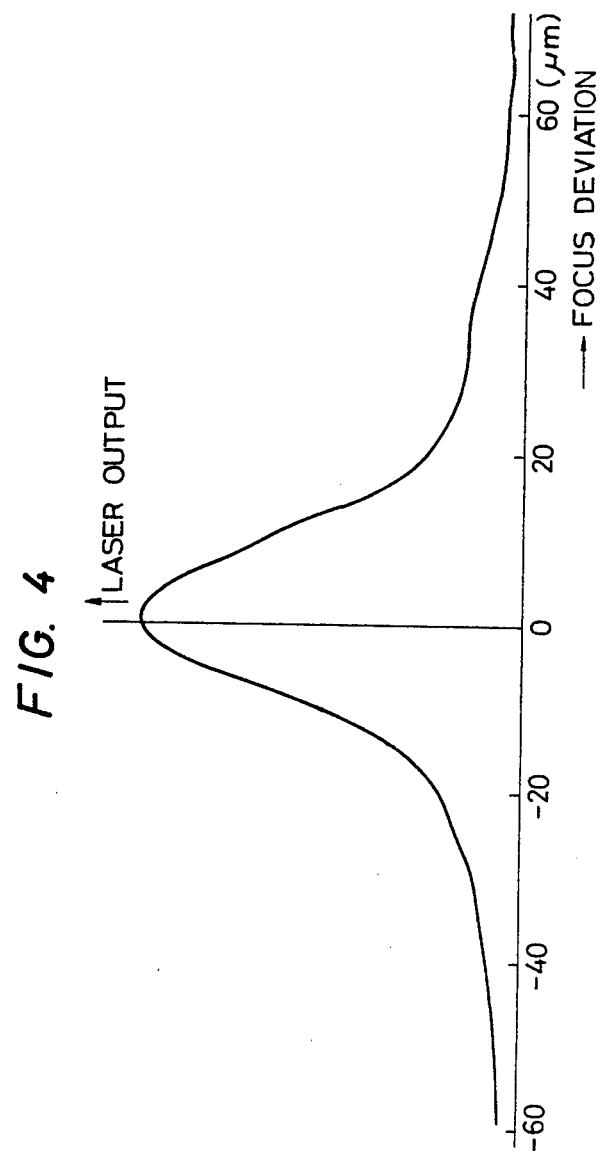
FIG. 4 is a diagram for explaining a detectable range of deviations for auto-focusing in an optical information processor of this invention.

FIG. 4 is a diagram showing the relationship between the focus deviation and the laser output. That is, it shows the variation of the light output from the semiconductor laser device at the time when, in the construction shown in FIG. 2, the numerical aperture NA of the coupling lens 2 was made large (NA=0.5) by neglecting Expression (4) which specifies the condition of the coupling lens that the light spot 5 on the disk 4 becomes the circular shape, and the disk 4 was minutely moved along the optical axis of the optical system. As shown in FIG. 4, the detectable range of deviations becomes 80 μm odd.

By making the numerical aperture of the coupling lens large, the changes of the focused position of the reflected fed-back light spot ascribable to the fluctuations of the disk become small, and the detectable range of deviations for the auto-focusing is expanded.

Figure 1:
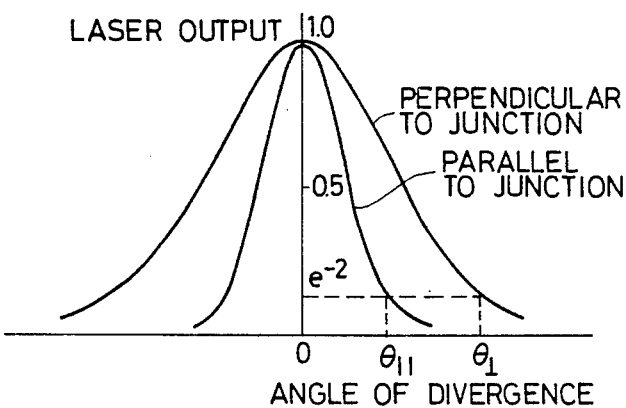
FIG. 1 is a diagram showing a far-field pattern of light of a semiconductor laser.

As the numerical aperture of the coupling lens is larger, the detectable range of deviations for the auto-focusing becomes wider, so that a more perfect auto-focusing can be realized against the vertical movements of the disk. Moreover, when the numerical aperture of the coupling lens is large, the beam from the semiconductor laser device enters the coupling lens more to that extent, and hence, the efficiency of utilization of the light of the laser device rises more. However, if the numerical aperture NA of the coupling lens approximately satisfies the divergence angle $\theta\perp$ in the vertical direction at $e^{-2}$ in the far-field pattern as shown in FIG. 1, most of the beam from the semiconductor laser device enters the coupling lens. In substance, accordingly, the following may be met:

$$\theta\| < \theta \leq \theta\perp \qquad (6)$$

Figure 5:
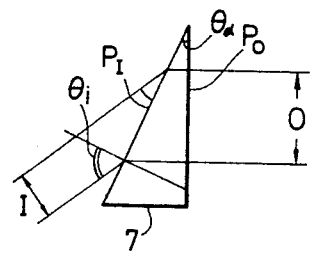
FIG. 5 is a diagram for explaining this invention.
Figure 6:
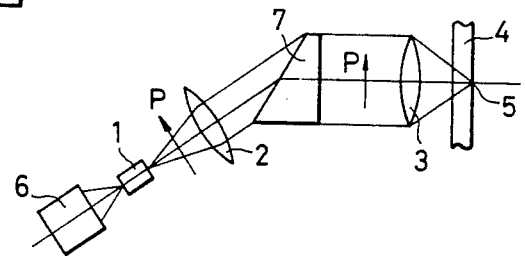
FIGS. 6 and 7 are diagrams each showing the construction of an embodiment of this invention.

Since, however, the light beam having passed through the coupling lens 2 as fulfills Expression (6) is not circular, the light spot 5 is not circular, either. In this invention, in order to solve this problem, a prism 7 is arranged at the stage posterior to the coupling lens 2 fulfilling Expression (6) as shown in FIG. 6. FIG. 5 shows the shape of the prism 7. Referring to FIG. 5, the prism is a rectangular prism whose apex is $\theta_a$ and whose refractive index is N. The angle of incidence is denoted by $\theta_i$, and the ratio between the width I of an incident beam and that O of a refracted beam (the ratio being termed the "magnification of beams") is denoted by $m=O/I$. Then, these are respectively given by the following expressions:

$$\left.\begin{array}{l}\cos\theta_i = \sqrt{\dfrac{N^2 - 1}{N^2 m^2 - 1}} \\[2mm] \cos\theta_a = m\sqrt{\dfrac{N^2 - 1}{N^2 m^2 - 1}} \\[2mm] m = \dfrac{\cos\theta_a}{\cos\theta_i}\end{array}\right\} \qquad (7)$$

Here, m is set according to the structure of the semiconductor device to be used. The prism 7 affords the circular beam by elongating the parallel divergence of the beam from the semiconductor laser device and bringing it into coincidence with the perpendicular divergence thereto. Accordingly, in case where most of the beam from the semiconductor laser device is caused to enter the coupling lens, the magnification m needs to be brought into coincidence with the ratio $\theta\perp/\theta\|$ of the divergence angles of the beam in order to obtain the circular beam. For example, in case of employing the BH type semiconductor laser device, $m=2$ holds from Expression (2), and in case of employing the CSP type semiconductor laser device, $m=3$ holds from Expression (1). Accordingly, when "BK7" (7th borosilicate crown glass as classified and designated by Schott und Genossen GmbH) (N=1.510) is employed as the material of the prism 7, the prism has the following quantities in conformity with Expression (7):

for the BH type semiconductor laser device;

$$\left.\begin{array}{l}m = 2\\ N = 1.510\\ \theta_i = 66.61°\\ \theta_a = 37.43°\end{array}\right\} \qquad (8)$$

for the CSP type semiconductor laser device;

$$\left.\begin{array}{l}m = 3\\ N = 1.510\\ \theta_i = 75.16°\\ \theta_a = 39.80°\end{array}\right\} \qquad (9)$$

In addition, when "SF-11" (11th heavy flint glass) (N=1.764) is employed as the glass material for the prism, the following holds:

for the BH type semiconductor laser device;

$$\left.\begin{array}{l}m = 2\\ N = 1.764\\ \theta_i = 64.56°\\ \theta_a = 30.79°\end{array}\right\} \qquad (10)$$

for the CSP type semiconductor laser device;

$$\left.\begin{array}{l}m = 3\\ N = 1.764\\ \theta_i = 73.76°\\ \theta_a = 32.98°\end{array}\right\} \qquad (11)$$

Accordingly, regarding the BH type semiconductor laser device having the beam divergence angles represented by Expression (2), the prism 7 represented by Expression (8) or Expression (10) is inserted immediately behind the coupling lens 2 in FIG. 6, while regarding the CSP type semiconductor laser device having the beam divergence angles represented by Expression (1), the prism 7 represented by Expression (9) or Expression (11) is inserted, whereby the conversion of the non-circular beam into the circular beam becomes possible. The light beam having been made circular is projected as the circular spot on the disk 4 by means of the objective 3. Thus, the beam from the semiconductor laser device whose light emitting region is rectangular, not square, can be projected as the circular spot on the disk without intercepting part thereof. Moreover, no aberration appears because of the use of the prism. In the construction as in the present embodiment wherein the beam emergent from one facet of the semiconductor laser device 1 is reflected by the disk and the reflected light is fed back to the facet, the numerical aperture of the coupling lens 2 is made large in accordance with Expression (6), so that the detectable range of deviations for the auto-focusing is expanded as shown in FIG. 4.

In FIG. 6, the beam from the semiconductor laser device 1 is set at the P-polarization (in which the electric field vector vibrates in the plane parallel to the sheet of the figure) as indicated by the arrow in the figure. The coupling lens 2 is arranged in its focal position with respect to the laser device 1, and renders the incident beam of the prism 7 a collimated beam.

Figure 7:
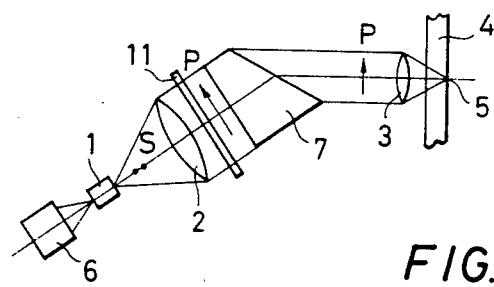

FIG. 7 is a diagram showing the construction of another embodiment of this invention, in which the same symbols as in FIG. 6 indicate the same or equivalent parts. In the embodiment of FIG. 7, unlike the embodiment of FIG. 6, the perpendicular divergence of the beam is contracted and is brought into coincidence with the parallel divergence, and the plane of incidence of the prism 7 is opposite to that in the embodiment of FIG. 6. More specifically, the beam from the semiconductor laser device 1 is set at the S-polarization (in which the electric field vector vibrates perpendicularly to the sheet of the figure) as indicated by black dots in the figure. It is converted into the P-polarization by a half-wave plate 11, and then enters the prism 7. With such construction, it becomes possible to make the objective 3 small.

Figure 8:
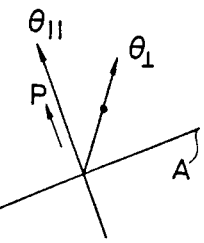
FIG. 8 is a diagram for explaining the operation of this invention.

From the foregoing, the polarization of the beam is the S-polarization in the direction perpendicular to the junction of the laser device and is the P-polarization in the direction parallel thereto as illustrated in FIG. 8.

In the above, there has been described only the optical information processor which records and plays back predetermined information by reflecting from the disk the beam emergent from one facet of the semiconductor laser device and feeding the reflected light back to the facet. This invention, however, is not restricted to such optical information processor but is also applicable to an optical information processor which records and plays back predetermined information by disposing a prism in an optical system for introducing a beam from a semiconductor laser device onto a disk, deriving reflected light from the disk by means of the prism and detecting the variation of the reflected light by means of a light detector.

Figure 9:
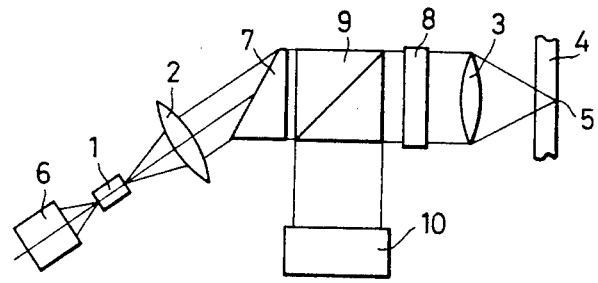
FIG. 9 is a diagram showing the construction of another embodiment of this invention.

FIG. 9 is a diagram showing the construction of an embodiment in the case where this invention is applied to such optical information processor. According to the present embodiment, in the construction of the embodiment shown in FIG. 6, a prism 9 and a quarter-wave plate 8 are arranged between the prism 7 and the objective 3. Such construction makes it possible to derive the reflected light from the disk 4 by means of the prism 9 and to detect the variation of the reflected light by means of a light detector 10. In the embodiment of FIG. 9, the light detector 6 is used as a laser light output monitor for the automatic power control for keeping the laser light output constant.

In the above description of this invention, the reflection loss due to the insertion of the prism 7 has not been referred to at all. It is desirable, however, to select the refractive index N of the prism 7 so that the reflection loss attributed to the prism may become as low as possible. Referring to FIG. 5, here will be explained the reflectivities $R_I$ and $R_O$ at the entrance facet $P_I$ and the exit facet $P_O$ of the prism 7. They are respectively given by the following expressions:

$$R_I = \frac{\tan^2(\theta_i - \theta_a)}{\tan^2(\theta_i + \theta_a)} \\ R_O = \left(\frac{N-1}{N+1}\right)^2 \Bigg\} \quad (12)$$

Figure 10:
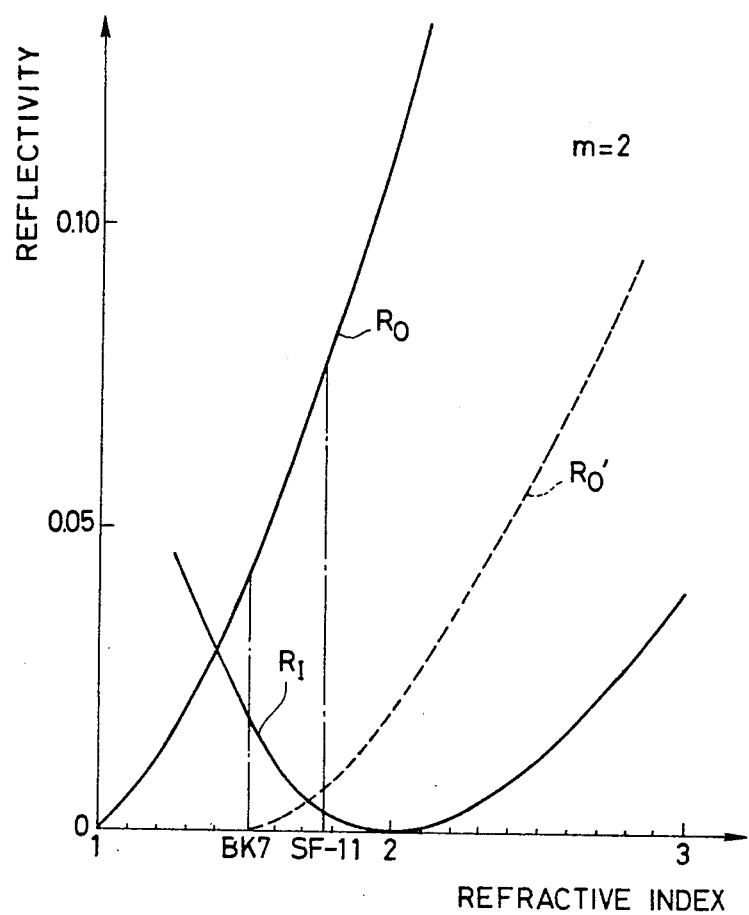
FIGS. 10 and 11 are diagrams each showing the relationships between the refractive index and the reflectivity at the entrance facet and exit facet of a prism.
Figure 11:
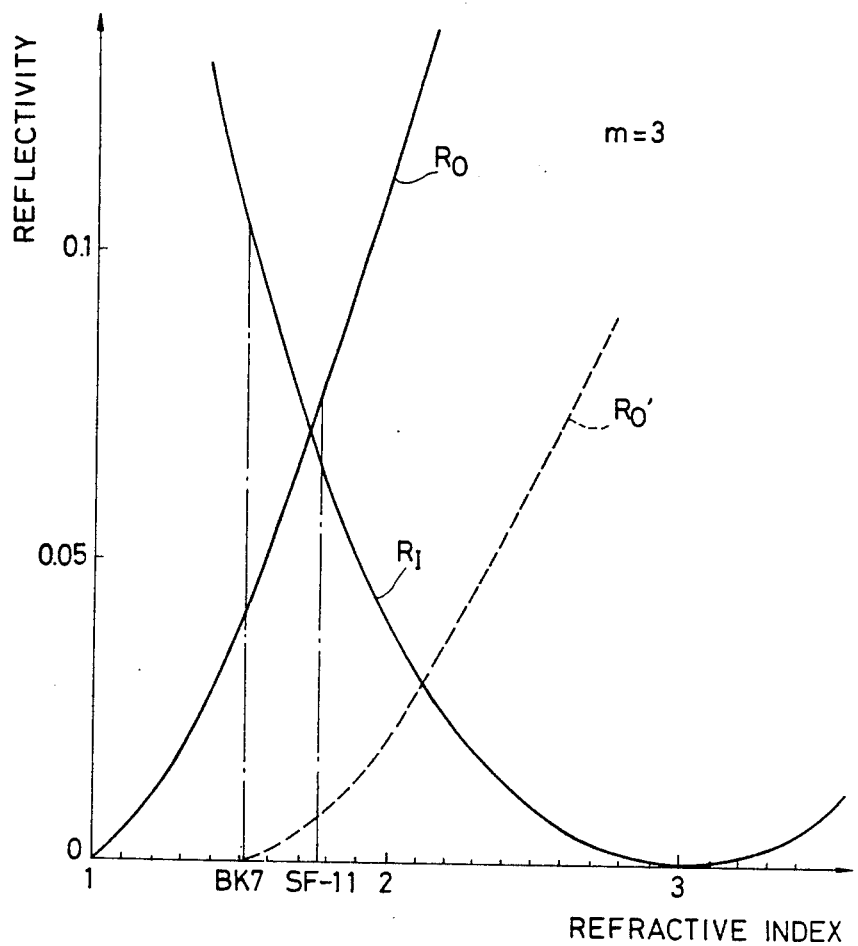

FIGS. 10 and 11 show the results of the relationships between the reflectivities $R_I$, $R_O$ and the refractive index N of the prism as obtained from Expressions (7) and (12). FIG. 10 illustrates a case where m=2, while FIG. 11 a case where m=3. $R_O'$ in the figures will be described later. The reflection loss of the prism is the least when the sum between $R_I$ and $R_O$ is the minimum. It is accordingly understood from the figures that a material whose refractive index N is about 1.4 is the most preferable as the prism material in the case of m=2, while a material whose refractive index N is about 1.7 is the most preferable in the case of m=3.

It is accordingly favorable to employ BK7 (N=1.510) for the BH type semiconductor laser device and SF-11 (N=1.764) for the CSP type semiconductor laser device as the material of the prism 7.

To the end of lessening the reflection loss due to the prism 7, it is also effective to coat the entrance and exit facets of the prism 7 with monolayered or multilayered anti-reflection films. In this case, it is also possible to make the reflectivity $R_I$ at the entrance facet $P_I$ sufficiently small by adjusting the refractive index N of the prism and to coat only the exit facet $P_O$ with the anti-reflection film. More specifically, in case of employing the BH type semiconductor laser device, as apparent from FIG. 10, the reflectivity $R_I$ can be made 1% or less by setting the refractive index N in a range of 1.65–2.45. By way of example, when SF-11 is employed as the prism material, the reflectivity $R_I$ at the entrance facet $P_I$ can be made 0.004. On the other hand, in case of employing the CSP type semiconductor laser device, as apparent from FIG. 11, the reflectivity $R_I$ can be made 1% or less by setting the refractive index N in a range of 2.45–3.55. By way of example, a crystal such as $TiO_2$ and $TeO_2$ can be employed as the prism material.

Figure 12:
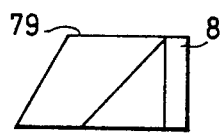
FIGS. 12 and 13 are diagrams each showing the construction of the essential portions of another embodiment of this invention.
Figure 13:
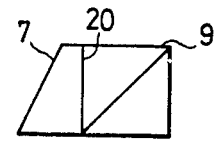

Further, in the embodiment of FIG. 9, the reflection loss can be lessened by putting the prism 7 and the prism 9 into a unitary structure as shown in FIG. 12 or FIG. 13. FIG. 12 shows an embodiment in the case where the prisms 7 and 9 are constructed into one body with an identical material. In the figure, numeral 79 indicates the prism put into one body, and the quarter-wave plate 8 is also bonded to the prism 79. By the unitary construction, the reflection losses at the exit facet of the prism 7 and the entrance facet of the prism 9 can be eliminated. FIG. 13 shows an embodiment in the case where the prisms 7 and 9 are constructed into one body by the use of different materials. By way of example, in case where the material of the prism 9 is BK7 (N=1.510), the reflectivity $R_O'$ at the boundary 20 between the prisms 7 and 9 is given by the following expression where N denotes the refractive index of the prism 7:

$$R_O' = \left(\frac{N - 1.510}{N + 1.510}\right)^2 \quad (13)$$

In FIGS. 10 and 11, the relationships between the reflectivity $R_O'$ and the refractive index N at m=2 and at m=3 are respectively indicated by dotted lines. As apparent from the figures, the reflection loss attributed to the prism 7 can be sharply improved. Supposing by way of example that the material of the prism 7 is SF-11 (N=1.764), the following can be established:

for the BH type semiconductor laser device;
$R_I$=0.004
$R_O'$=0.006 and for the CSP type semiconductor laser device;
$R_I$=0.067
$R_O'$=0.006

In the above embodiments, description has been made of the case where the non-circular beam having passed through the coupling lens is converted into the circular beam by arranging the single prism at the stage posterior to the coupling lens. Needless to say, however, a plurality of prisms may well be arranged at the stage posterior to the coupling lens. In the following embodiments, cases where two prisms are arranged will be described.

Figure 14:
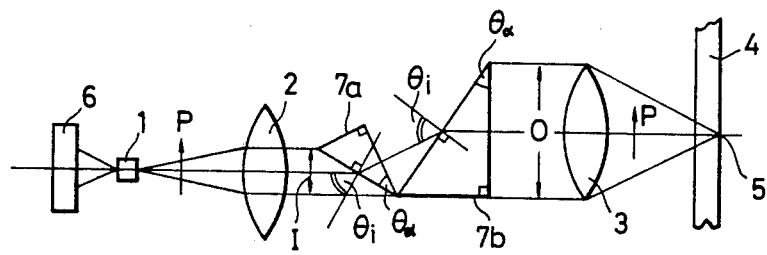
FIGS. 14, 15 and 16 are diagrams each showing the construction of another embodiment of this invention.
Figure 15:
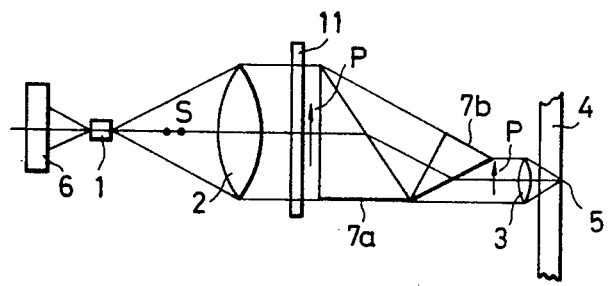
Figure 16:
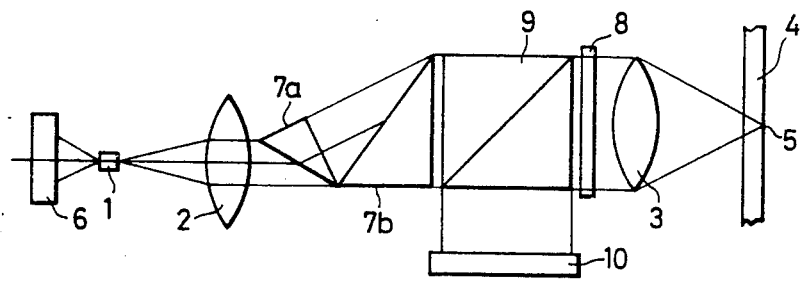

FIGS. 14, 15 and 16 are diagrams each showing the construction of another embodiment of this invention, in which the same symbols as in FIGS. 6, 7 and 9 indicate the same or equivalent parts. In the embodiments of FIGS. 14, 15 and 16, in the respectively corresponding constructions of the embodiments shown in FIGS. 6, 7 and 9, two prisms 7a and 7b are arranged at the stage posterior to the coupling lens 2. The two prisms have equal apices and refractive indices, and further they have equal entrance angles and exit angles of the light beam. Referring to the figures, the prisms 7a and 7b are rectangular prisms whose apices are $\theta_\alpha$ and whose refractive incices are N, and the angle of incidence of each prism is denoted by $\theta_i$, while the ratio between the width I of the incident beam and that O of the refracted beam (the magnification of beams) is denoted by $m = O/I$. Then, they are respectively given by the following expression:

$$\left.\begin{array}{l} \cos \theta_i = \sqrt{\dfrac{N^2 - 1}{N^2 m - 1}} \\[2mm] \cos \theta_\alpha = \sqrt{\dfrac{(N^2 - 1)m}{N^2 m - 1}} \\[2mm] \sqrt{m} = \dfrac{\cos \theta_\alpha}{\cos \theta_i} \end{array}\right\} \quad (14)$$

The reflectivity $R_I$ at the entrance facet of each of the prisms 7a and 7b is given by the following expression:

$$R_I = \frac{\tan^2(\theta_i - \theta_\alpha)}{\tan^2(\theta_i + \theta_\alpha)} \quad (15)$$

Here, assuming that $\theta_i + \theta_\alpha = 90°$, the reflectivity $R_I$ becomes zero, and the reflection loss of light at the entrance facet of each of the prisms 7a and 7b becomes zero. (A case where $\theta_i = \theta_\alpha$ corresponds to the normal incidence, and produces no effect of the prisms.) Here, the reflectivity $R_I$ becomes zero at the time when $\tan \theta_i = N$, this angle being the so-called Brewster angle. At this time, Expression (14) is reduced as follows:

$$\left.\begin{array}{l} N = \sqrt{m} \\ \theta_i = \tan^{-1} N \\ \theta_\alpha = \cos^{-1}[\sqrt{m} \cos \theta_i] \end{array}\right\} \quad (16)$$

In the case of employing, for example, the CSP type semiconductor laser device, the shape of the two prisms 7a and 7b becomes as follows on the basis of Expression (16) under the condition that the beam magnification m is 3 on the basis of Expression (1):

$$\left.\begin{array}{l} m = 3 \\ N = 1.732 \\ \theta_i = 60° \\ \theta_\alpha = 30° \\ R_I = 0 \end{array}\right\} \quad (17)$$

Accordingly, as regards the CSP type semiconductor laser having the beam divergence angles represented by Expression (1), the two prisms 7a and 7b represented by Expression (17) are inserted immediately behind the coupling lens 2 as shown in FIGS. 14, 15 or 16, whereby the non-circular beam can be converted into the circular beam. Even in case where the refractive indices N of the prism 7a and 7b cannot be made the value $\sqrt{m}$ at which the reflectivity $R_I$ becomes zero, refractive indices close to the value are satisfactorily feasible because they render the reflectivity $R_I$ almost zero. It is desirable to coat the exit facet with an anti-reflection film.

Figure 17:
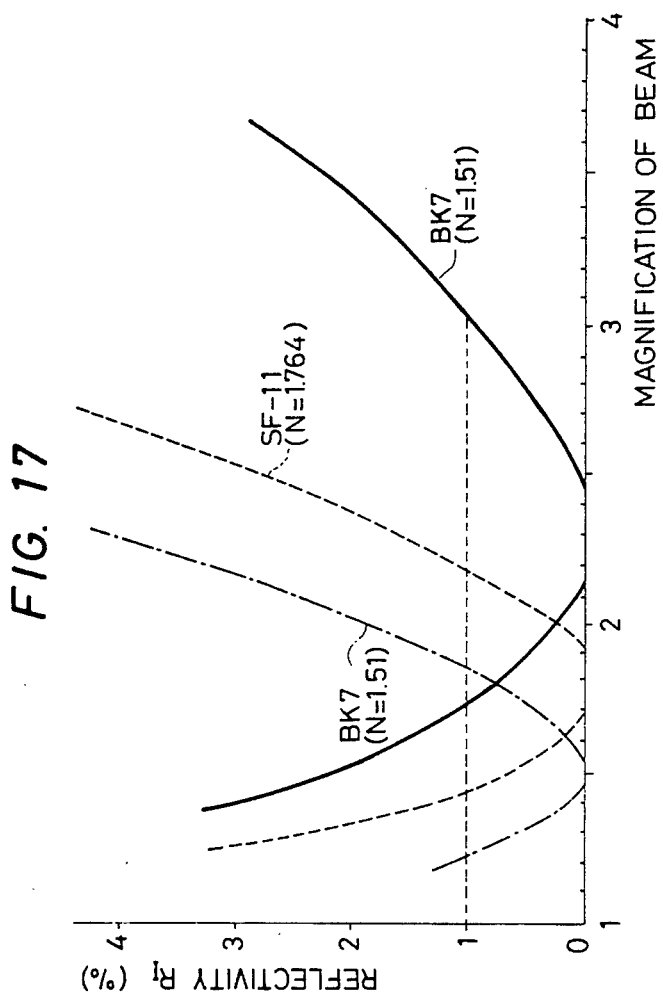
FIG. 17 is a diagram showing the relationship between the reflectivity at the entrance facet of a prism and the ratio of the width of a refracted beam to that of an incident beam.

The relationship between the beam magnification m and the reflectivity $R_I$ is illustrated in FIG. 17. In the figure, a one-dot chain line indicates a case where a single prism made of BK7 (N=1.510) was used, and a broken line indicates a case where a single prism made of SF-11 (N=1.764) was used. As apparent from FIG. 17, in case where the single prism 7 is comprised as in the embodiment of FIG. 6, 7 or 9 and where the beam magnification m is set at 2-3, the material of the prism needs to have a fairly great refractive index N in order to lessen the reflection loss of light at the entrance facet of the prism. Referring again to the figure, a solid line indicates a case where two prisms made of BK7 were used. In case of the generally known glass material BK7, the refractive index N is 1.510 near a wavelength of 8,000 Å. In this case, the reflectivity $R_I$ becomes zero when the beam magnification m is 2.28. Moreover, as apparent from the figure, the transmission coefficient is at least 99.9% in the range in which the beam magnification m is 2.1–2.5. If the transmission coefficient is permitted down to 99%, the prism made of BK7 can be used in the range in which the beam magnification m is 1.8–3. That is, when the two prisms 7a and 7b are comprised as in the embodiment of FIG. 14, 15 or 16, the prisms having the small refractive index N can make the beam magnification m large and can also expand the usable range. This results in the advantage that the circular beam can be formed by the use of the prisms made of the conventional optical glass (i.e., BK7).

Figure 18:
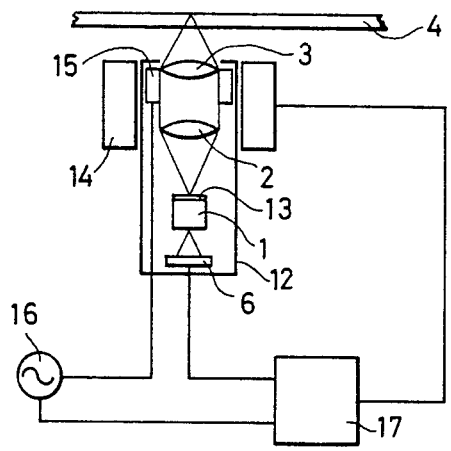
FIG. 18 is a diagram showing the construction of another embodiment of this invention.

Further, an embodiment in the case of executing the auto-focusing control with this invention will be described. FIG. 18 is a diagram showing the construction of another embodiment of this invention. Referring to the figure, an optical pickup 12 is made up of the semiconductor laser device 1, the coupling lens 2, the objective 3 and the light detector 6. A laser beam emergent from one facet 13 of the semiconductor laser device 1 is projected onto the disk 4 through the lenses 2 and 3, and is reflected from the disk 4. The reflected beam is fed back to the exit facet 13 of the semiconductor laser through the lenses 2 and 3. With such construction, the laser output of the semiconductor laser device 1 varies in accordance with the changes of the reflectivity of the disk, and hence, information is played back by detecting the variation with the light detector 6.

The auto-focusing control carries out a feedback control through the detection of a deviation of a focused spot and by means for moving the objective or the whole optical pickup in response to the deviation.

Figure 19:
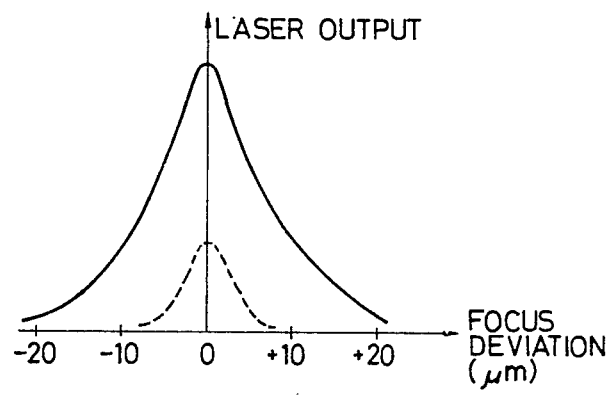
FIGS. 19 and 20 are characteristic curve diagrams showing the dependencies of the light output of a semiconductor laser and the output of a phase-sensitive detection circuit on the deviation of a light spot from a disk surface, respectively.
Figure 20:
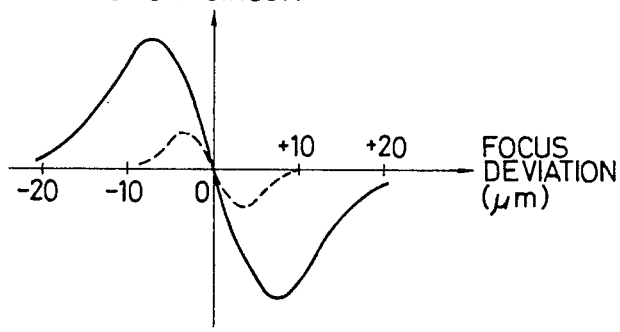

The detection of the deviation of the focused spot exploits the characteristic (indicated by a dotted line in FIG. 19) that the optical output of the semiconductor laser decreases due to the focus deviation. With the characteristics, however, the sense of the focus deviation is not known. Therefore, the lens or the semiconductor laser device is wobbled in the direction of the optical axis, and the laser output is synchronously detected, whereby the sense of the focus deviation can be known. In the construction of FIG. 18, the lens 3 is wobbled in the direction of the optical axis by means of a piezoelectric vibrator 15 and in accordance with a signal of an alternating current source 16. The laser output detected by the light detector 6 is synchronously detected by a phase-sensitive detection circuit 17 with reference to the signal of the alternating current source 16. As shown in FIG. 20, the output of the phase-sensitive detection circuit 17 has its polarity changed in dependence on the sense of the focus deviation.

The output of the phase-sensitive detection circuit 17 is fed back to an electromagnetic coil 14, to move the objective 3 or the whole optical pickup 12 so as to reduce the focus deviation.

Figure 22:
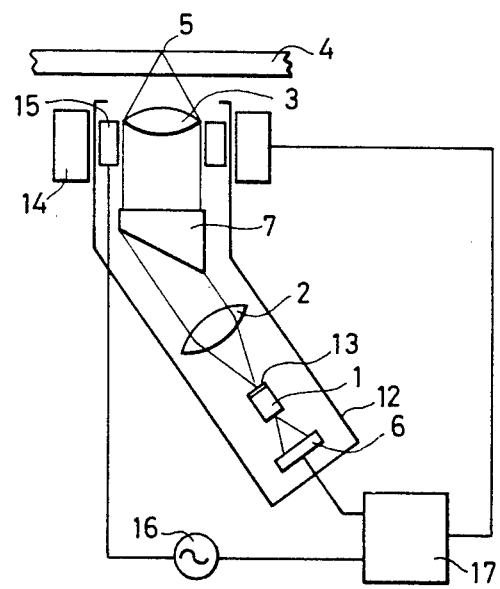
FIG. 22 is a diagram showing the construction of another embodiment of this invention.

FIG. 22 is a diagram showing the construction of another embodiment of this invention at the time when the numerical aperture of the coupling lens 2 is made 0.5. The embodiment is such that auto-focusing control means is disposed in the construction of FIG. 6. More specifically, in case where the numerical aperture of the coupling lens 2 is made larger than the minimum beam divergence angle of the laser beam from the semiconductor laser device 1, the beam emergent from the coupling lens 2 becomes elliptic. By arranging the prism 7 posterior to the coupling lens 2, accordingly, the beam emergent from the coupling lens 2 is made circular and then guided to the objective 3, and the circular light spot 5 is formed on the disk 4 by the objective 3. The reflected light from the disk 4 is fed back to the semiconductor laser device 1. Since the laser output of the semiconductor laser device varies in accordance with the changes of the reflectivity of the disk, information is played back by detecting the variation by means of the light detector 6. The auto-focusing control is carried out in such a way that the objective 3 is wobbled in the direction of the optical axis by means of the piezoelectric vibrator 15 and in accordance with the signal of the alternating current source 16, that the laser output detected by the light detector 6 is synchronously detected by means of the phase-sensitive detection circuit 17 with reference to the signal of the alternating current source 16, that the output of the phase-sensitive detection circuit 17 is fed back to the electromagnetic coil 14, and that the objective 3 or the entire optical pickup 12 is moved by the electromagnetic coil 14 so as to reduce the deviation of the focused spot.

The feature of the embodiment in FIG. 18 or 22 is that the detectable range of deviations for the auto-focusing control is expanded by coating the laser exit facet 13 with the anti-reflection film. In FIGS. 19 and 20, a solid line and a broken line correspond to a case where the anti-reflection coating exists and a case where it does not exist, respectively. It is understood that when the anti-reflection film is not provided, the detectable range of deviations is 10 $\mu$m odd, whereas when the film is provided, the range is expanded to 40 $\mu$m odd. The results of FIGS. 19 and 20 correspond to a case where the numerical aperture NA of the objective 3 was 0.5 and that of the coupling lens 2 was 0.25.

Figure 21:
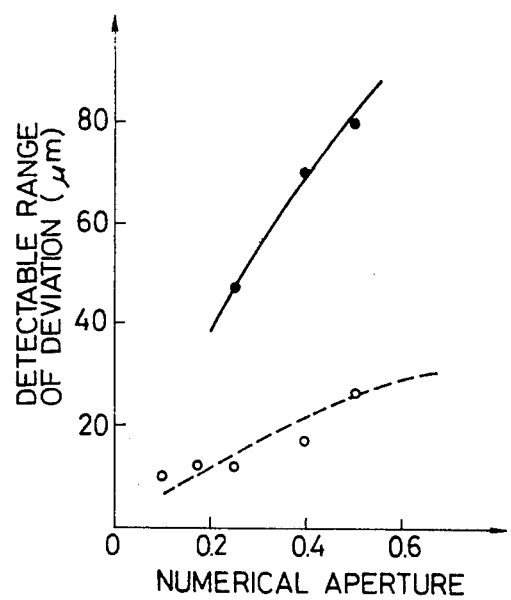
FIG. 21 is a diagram showing the dependency of the detectable range of deviations for the auto-focusing control on the numerical aperture of a lens.

FIG. 21 illustrates the dependency of the detectable range of deviations for the auto-focusing control on the numerical aperture of the coupling lens 2. By way of example, when the numerical aperture of the coupling lens 2 is made 0.5, the detectable range of deviations becomes 80 $\mu$m odd by providing the anti-reflection film (indicated by a solid line) but it is below 30 $\mu$m without the coating (indicated by a dotted line).

As described above, in the optical information processor of the construction wherein the beam emergent from one facet of the semiconductor laser device is reflected by the disk and wherein the reflected light is fed back to the facet, the detectable range of deviations for the auto-focusing control is further expanded by coating the facet with the anti-reflection film. Thus, even in case where the vertical movements of the disk are as large as about 1 mm, the auto-focusing control becomes possible.

In the above description of this invention, the optical information processor of the construction wherein the beam emergent from one facet of the semiconductor laser device is reflected by the disk and wherein the reflected light is fed back to the facet has been described as to the case where the variation of the quantity of the reflected light from the disk is detected in the form of the variation of the laser beam from the other facet of the semiconductor laser. It is a matter of course, however, that the invention is also applicable to a case where the variation of the reflected light is detected in the form of the variation of a driving current of the semiconductor laser.

As apparent from the above description, this invention is characterized in that a prism for converting the profile of a beam from a semiconductor laser device is arranged in an optical system which guides the beam to an information storage medium. It is to be understood that the invention is not restricted to the foregoing embodiments only, but that many modifications or changes can be made without departing from the scope and spirit of the invention.

We claim:

1. An optical information processor comprising a light source formed by a semiconductor laser having a rectangular light emitting region which emits a beam of light having a substantially-elliptical cross section, an information storage medium, an optical system which focuses the beam of light emitted by the semiconductor laser onto the information storage medium, and means for detecting variations in the amount of light emergent from the information storage medium; wherein said optical system includes means in the form of at least one prism for converting the elliptical light beam emitted by said semiconductor laser device into a beam of circular cross section.

2. An optical information processor as defined in claim 1, wherein said optical system includes two prisms whose apices and refractive indices are equal.

3. An optical information processor as defined in claim 2, wherein the angle of divergence of the beam from said semiconductor laser in a direction perpendicular to the junction thereof is m times greater than that in a direction parallel to the junction, and wherein said two prisms satisfy a relationship of substantially $N=\sqrt{m}$, where N denotes the refractive indices of the two prisms.

4. An optical information processor as defined in claim 1, wherein optical means to derive the reflected beam from said information storage medium is disposed in an optical path between said prism and said information storage medium, and said detecting means includes a light detector which receives the reflected beam from said optical means.

5. An optical information processor as defined in claim 4, wherein said optical means includes said prism.

6. An optical information processor as defined in claim 1, wherein said prism has at least its exit facet provided with an anti-reflection film.

7. An optical information processor as defined in claim 1, wherein a lens which substantially satisfies $\theta_\| < \theta \leq \theta_\perp$ (where $\theta$ denotes a half solid angle defined between said laser device and said lens, and $\theta_\|$ and $\theta_\perp$ denote divergence angles of the beam from said laser device in a direction parallel to a junction of said laser device and a direction perpendicular thereto, respectively) is arranged in an optical path between said semiconductor laser and said prism, the beam emergent from one facet of said semiconductor laser being reflected by said medium and then returned to said facet through said optical system, and said detecting means includes a light detector which receives the beam emergent from the other facet of said semiconductor laser.

8. An optical information processor as defined in claim 7, wherein one facet of said semiconductor laser is provided with an anti-reflection film, and further comprising first driving means to vibrate said optical system along its optical axis at a predetermined period, and second driving means to move said optical system along its optical axis in accordance with an output of said light detector.

9. An optical information processor comprising
a light source formed by a semiconductor laser having a rectangular light emitting region,
an information storage medium,
an optical system for projecting a non-circular light beam emitted by said laser as a circular light spot onto said medium, the optical system comprising first lens means for converting said non-circular light beam into a collimated non-circular light beam, prism means for converting said collimated non-circular light beam into a collimated circular light beam, and second lens means for focusing said collimated circular light beam onto said medium, and
detection means for detecting variations in the amount of said light beam emergent from said medium.

10. A processor according to claim 9, wherein the angle of divergence of the beam from said laser in a direction perpendicular to the junction of the laser is m times greater than that in the direction parallel to the junction, said prism means comprises a prism whose refractive index is N, the prism having a first surface whose normal is arranged at an angle $\theta_i$ to the beam entering therein, a second surface which is arranged perpendicular to the beam leaving therefrom, and the apex formed between the first surface and the second surface is $\theta_a$, the values of m, N, $\theta_i$ and $\theta_a$ being governed by the relations $$\cos\theta_i = \sqrt{\frac{N^2-1}{N^2 m^2 - 1}} \text{ and } \cos\theta_a = m\sqrt{\frac{N^2-1}{N^2 m^2 - 1}}.$$

11. A processor according to claim 10, wherein at least said second surface of said prism is coated with an anti-reflection film.

12. A processor according to claim 9, wherein the angle of divergence of the beam from said laser in a direction perpendicular to the junction of said laser is m times greater than that in a direction parallel to the junction, said prism means comprises a prism whose refractive index is N, the prism having a first surface which is arranged perpendicular to the beam entering therein, a second surface whose normal is arranged at an angle $\theta_i$ to the beam leaving therefrom, and the apex formed between the first surface and second surface is $\theta_a$, the values of m, N, $\theta_i$ and $\theta_a$ being governed by the relations $$\cos\theta_i = \sqrt{\frac{N^2-1}{N^2 m^2 - 1}} \text{ and } \cos\theta_a = m\sqrt{\frac{N^2-1}{N^2 m^2 - 1}}.$$

13. A processor according to claim 12, wherein the optical system further comprises a half-wave plate arranged in the optical path between the first lens means and the prism.

14. A processor according to claim 12, wherein at least said first surface of said prism is coated with an anti-reflection film.

15. A processor according to claim 9, wherein the angle of divergence of the beam from said laser in a direction perpendicular to the junction of said laser is m times greater than that in a direction parallel to the junction, the prism means comprises two prisms whose refractive indices are N, each of the prisms having a first surface whose normal is arranged at an angle $\theta_i$ to the beam entering therein, a second surface which is arranged perpendicular to the beam leaving therefrom, the apex formed between the first surface and the second surface is $\theta_a$, the values of m, N, $\theta_i$ and $\theta_a$ being governed by the relations $$\cos\theta_i = \sqrt{\frac{N^2-1}{N^2 m - 1}} \text{ and } \cos\theta_a = \sqrt{\frac{(N^2-1)m}{N^2 m - 1}}.$$

16. A processor according to claim 15, wherein at least said second surface of each of said prisms is coated with an anti-reflection film.

17. A processor according to claim 9, wherein the angle of divergence of the beam from said laser in a direction perpendicular to the junction of said laser is m times greater than that in a direction parallel to the junction, the prism means comprises two prisms whose refractive indices are N, each of the prisms having a first surface which is arranged perpendicular to the beam entering therein, a second surface whose normal is arranged at an angle $\theta_i$ to the beam leaving therefrom, and the apex formed between the first surface and the second surface is $\theta_a$, the values of m, N, $\theta_i$ and $\theta_a$ being governed by the relations.

$$\cos\theta_i = \sqrt{\frac{N^2-1}{N^2 m - 1}} \text{ and } \cos\theta_a = \sqrt{\frac{(N^2-1)m}{N^2 m - 1}}.$$

18. A processor according to claim 17, wherein the optical system further comprises a half-wave plate arranged in the optical path between the first lens means and said prisms.

19. A processor according to claim 17, wherein at least said first surface of each of said prisms is coated with an anti-reflection film.

20. A processor according to claim 9, wherein the optical system further comprises optical means disposed in the optical path between said prism means and said second lens means to receive the reflected beam from said information storage medium, and said detection means includes a light detector which receives the reflected beam from said optical means.

21. A processor according to claim 20, wherein the optical system further comprises a quarter-wave plate arranged in the optical path between said optical means and said second lens means.

22. A processor according to claim 21, wherein said prism means and said optical means are combined in one body, and said quarter-wave plate is bonded to said body.

23. A processor according to claim 20, wherein the beam emergent from one facet of said laser is projected on said information storage medium through said optical means, and a further light detector is arranged to receive the beam emergent from the other facet of said laser and to monitor the output of said laser.

24. A processor according to claim 20, wherein said prism means and said optical means are combined in one body.

25. A processor according to claim 9, wherein said first lens means comprises a lens which substantially satisfies the relation $\theta_\parallel < \theta \leq \theta_\perp$ (where $\theta$ denotes the half solid angle defined between said laser and said lens, and $\theta_\parallel$ and $\theta_\perp$ denote the angle of divergence of the beam from said laser in a direction parallel to the beam from said laser in a direction parallel to the junction of said laser and a direction perpendicular to the junction, respectively), the beam emergent from one facet of said laser being reflected by said information storage medium and then returned to said facet through said optical system, and the direction means includes a light detector which receives the beam emergent from the other facet of said laser.

26. A processor according to claim 25, wherein one facet of said laser is provided with an anti-reflection film.

27. A processor according to claim 25 or claim 26, further including first driving means which vibrates the second lens means along its optical axis with a predetermined period, and second driving means which moves an optical pickup formed by said laser, said optical system and said light detector along the optical axis of said second lens means in dependence upon the output of the light detector.

28. A processor according to claim 27, wherein said first driving means comprises an alternating current source generating a signal with a predetermined period, and a piezoelectric vibrator vibrating the second lens means along its optical axis in accordance with the signal from the alternating current source, and said second driving means comprises a phase-sensitive detection circuit detecting synchronously the output of the light detector with reference to the signal of the alternating current source, and an electromagnetic coil moving the optical pickup along the optical axis of the second lens means in dependence upon the output of the phase-sensitive detection circuit.

29. A processor according to claim 25 or claim 26, further including driving means which vibrates the second lens means along its optical axis with a predetermined period, said driving means moving said second lens means along the optical axis in dependence upon the output of the light detector.

* * * * *